INVENTOR
WILLIAM J. TRABILCY
BY Strauch, Nolan, Neale, Nies & Kurz
ATTORNEYS

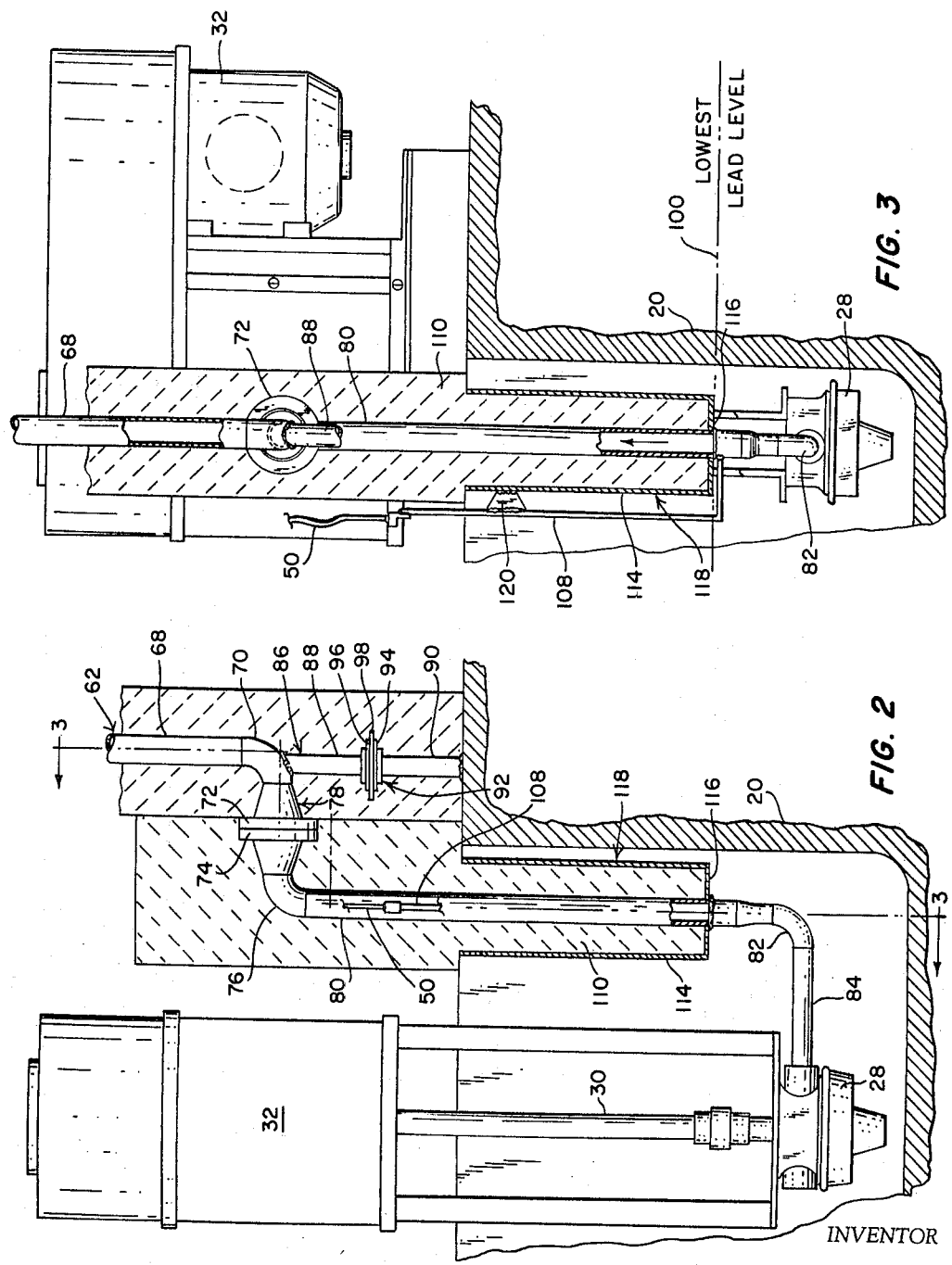

Feb. 27, 1968  W. J. TRABILCY  3,371,186
TYPE METAL TRANSPORTATION SYSTEMS
Filed May 1, 1967  5 Sheets-Sheet 4
FIG. 5
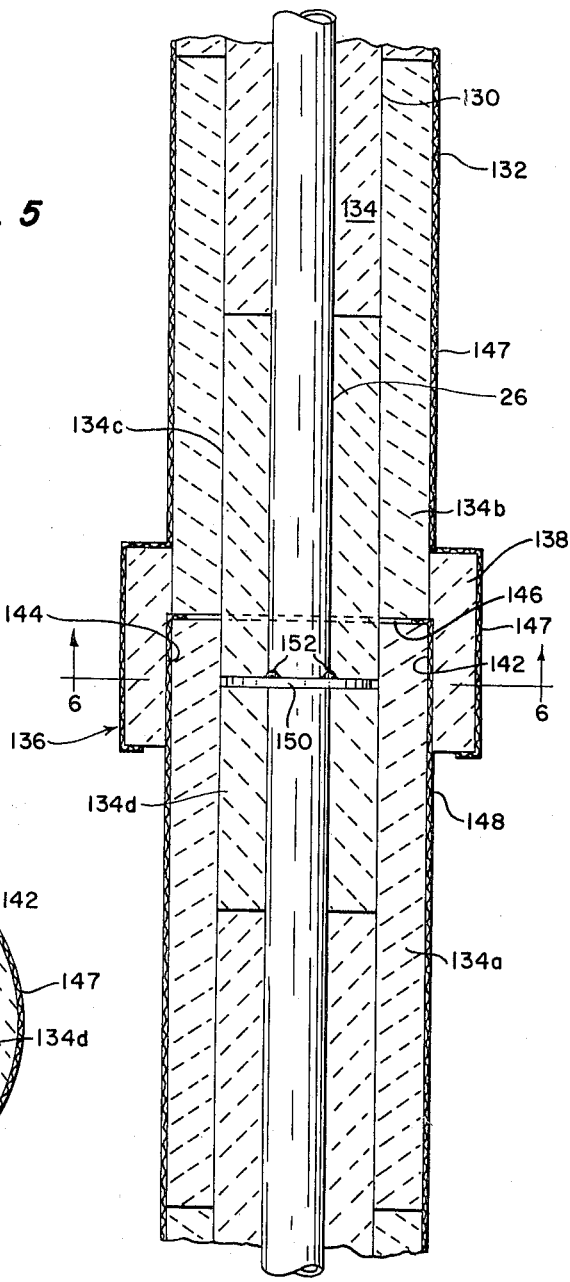
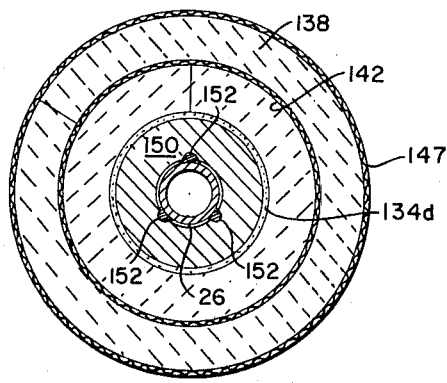
FIG. 6
INVENTOR
WILLIAM J. TRABILCY
BY Strauch, Nolan, Neale, Nies & Kurz
ATTORNEYS Feb. 27, 1968 W. J. TRABILCY 3,371,186
TYPE METAL TRANSPORTATION SYSTEMS
Filed May 1, 1967 5 Sheets-Sheet 5

INVENTOR
WILLIAM J. TRABILCY
BY Strauch, Nolan, Neale,
Nies & Kurz
ATTORNEYS

United States Patent Office 3,371,186
Patented Feb. 27, 1968

3,371,186
TYPE METAL TRANSPORTATION SYSTEMS
William J. Trabilcy, 280 Prospect Ave.,
Hackensack, N.J. 07604
Filed May 1, 1967, Ser. No. 635,023
7 Claims. (Cl. 219—300)

ABSTRACT OF THE DISCLOSURE

In the transportation system disclosed herein, molten metal is pumped through an electrically heated pipeline which is arranged in the form of an inverted U between a source of the molten metal and a receptacle. Both the inlet and outlet ends of the pipeline are continuously immersed in the molten metal to maintain liquid columns in the vertical sections of the piperline when the delivery pump is shut down. The pipeline is heated substantially throughout its entire length to keep the columns of metal in the vertical pipe sections molten during shutdown. The pipeline insulation is provided with expansion joints having relatively slidable sections which prevent exposure of the pipeline when it expands upon heating. A terminal or tap, which is connected to the midpoint of the pipeline for transmitting electrical current to heat the pipeline, is tubular, and a temperature sensing element for controlling the current flow extends across the midpoint to simultaneously sense the pipeline temperatures on the opposite sides of the terminal.

Field of invention

This invention relates to a pipeline heating and transportation system for conveying a fluid and is more particularly concerned with a system in which a pipeline for conveying molten metal or viscous material is heated by passing an electrical current therethrough.

Background

As disclosed in United States Letters Patent 2,981,818, issued on Apr. 25, 1961, stero or type metal, which is used by the newsprinting industry in the production of cast printing plates for printing presses, is melted down in large-capacity melting pots and is pumped in its molten state to casting stations where new plates are cast for use in a printing run. After the plates are used in a press or printing run, they are returned to the melting pot and re-melted.

The casting station conventionally comprises a storage or casting pot from which the molten metal is dispensed into each mold. The casting pots usually are quite remote from the melting pot. The stereo metal is generally composed of 81% lead, 5% tin, and 14% antimony and has a mixture melting temperature of approximately 480° F.

In the transportation system disclosed in the patent mentioned above, the molten stereo metal is pumped through a pipeline extending from the melting pot and having an outlet disposed over the casting pot at the casting station. By passing a controlled electrical current through the pipeline, it is heated to prevent the molten metal from solidifying or becoming objectionably chilled during transportation from one pot to the other. This patented system has been found to be exceptionally dependable, practical, and efficient for transporting and heating the molten metal. Some problems, however, are occasionally encountered when the pump for delivering the molten stereo metal to the casting stations is shut down.

One problem results from the difficulty in obtaining a clean shutoff of metal flow at the outlet end of the pipeline when operation of the pump is stopped. This condition sometimes became troublesome because the drippings produced by drainage upon shutdown quickly solidify at the outlet end, tending to clog the pipe and thus restrict flow when the pump is re-started. Also, the exposure of the drainage to the air objectionably results in the formation of dross. Dross was also found to form on the interior of the pipe during shutdown and this prematurely shortened the normal life of the pipe. Although it is evident that these problems are not so significant as to materially impair the effective and efficient transportation of the molten metal, their solution contributes greatly to long, trouble-free operation.

Summary of invention and objects

The present invention contemplates and has as its major object the provision of a novel pipeline transportation and heating system which overcomes the foregoing problems. This is essentially accomplished by providing the pipeline with two vertical end sections which are adapted to extend into the melting and casting pots sufficiently far that the inlet and outlet ends are always below the level of the molten metal. The terminal connections for passing an electrical current through the pipeline are made at the midpoint of the pipeline and at its extremities below the level of the molten metal.

When the pump is started for the first time, all air is forced out of the pipeline. Upon shutdown, therefore, a column of molten metal will remain standing in vertical sections of the pipeline because of the head of the molten metal in the pots and of the atmospheric pressure acting on the metal in the pots. These columns of molten metal seal the pipeline against introduction of air when the pump shuts down. Also, by immersing the outlet in the molten metal accumulated in the casting pot, the problem of drippings is avoided. The columns of molten metal in the vertical pipe sections further will not solidify or become objectionably chilled because the arrangement of terminal connections maintains an electric current flow along these sections.

Another object of this invention is to provide for a novel pipe insulation expansion joint which prevents exposure of the pipeline when the line expands upon heating. Cold spots are thus avoided.

Still another object of this invention is to provide for a novel electrical terminal connection and arrangement for sensing pipeline temperature for avoiding overheating of localized pipe regions. It is desirable to avoid this condition because hot spots tend to structurally weaken or even burn holes through the standard carbon-steel pipe which is utilized in this invention as an electrical current conductor by connecting it to a source of electrical current.

Further objects of this invention will appear as the description proceeds in connection with the appended claims and annexed drawings wherein:

FIGURE 2 is an enlarged, partially sectioned, fragmentary elevation illustrating details of the pipeline heating system at the melting pot for the stereo metal;

FIGURE 3 is a section taken substantially along lines 3—3 of FIGURE 2;

FIGURE 5 is an enlarged section illustrating one of the insulation expansion joints of this invention;

FIGURE 6 is a section taken substantially along lines 6—6 of FIGURE 5;

Figure 1:
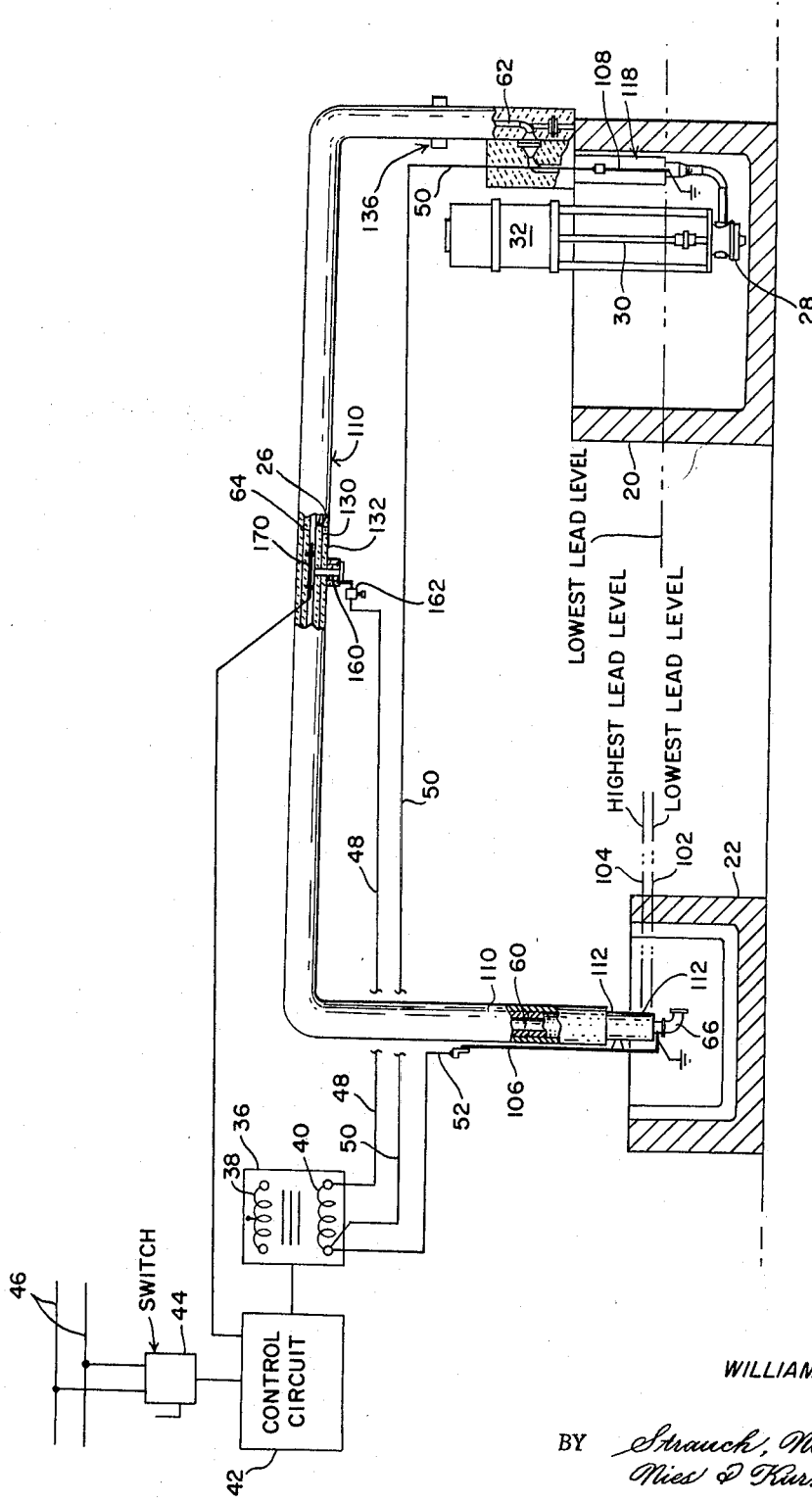
FIGURE 1 is a partially diagrammatic, partially sectioned elevation illustrating a preferred embodiment of this invention.

Referring now to the drawings and more particularly to FIGURE 1, the transportation and heating system of this invention is shown to be utilized for heating and conveying molten stereo metal in the production of printing plates for printing newspapers. The system comprises a melting pot 20 and a casting pot or box 22, both of which are of suitable conventional construction. Box 22 may enclose a metal shell mold for forming the molten metal plates. Melting pot 20 is heated by known, suitable means (not shown) to approximately a temperature of 620° F. for melting the stereo metal and for maintaining it in a molten state.

To deliver the stereo metal to the casting pot in its unchilled, molten state, the transportation and heating system of this invention comprises an impedance heated pipeline 26 extending from melting pot 20 to casting pot 22. Pipeline 26 extends into the melting pot and is connected below the minimum operating level of molten metal to the outlet of a motor-driven pump 28. The unshown impeller of pump 28 is connected by an unstanding drive shaft 30 to an electric motor 32. The inlet of pump 28 is below the minimum operating level of molten metal in melting pot 20. When pump 28 is operated, molten stereo metal is withdrawn from pot 20 and delivered through pipeline 26 to casting pot 22. Pipeline 26 is made of electrically conductive metal and may be fabricated from any suitable carbon-steel pipe. The molten metal in pipeline 26 is heated to prevent solidification or chilling by passing an electrical current through the pipeline to thereby heat and raise the pipeline temperature. This is accomplished by providing a transformer 36 having a primary winding 38 and a secondary winding 40. Advantageously, primary winding 38 is of the variable tap type as disclosed in the aforesaid Patent No. 2,981,818 and is connected by a temperature control circuit 42 and a suitable manual disconnect line switch 44 to a voltage source 46. Circuit 42 is the same as that described in Patent No. 2,981,818.

One terminal of secondary winding 40 is connected by a suitable conductor 48 to the impedance midpoint of pipeline 26. The other terminal of secondary winding 40 is connected by separate conductors 50 and 52 to the opposite end regions of pipeline 26 at pots 20 and 22 respectively. At the connections of conductors 50 and 52 to pipeline 26, the pipeline is grounded to earth to assure zero potential at these points.

From the foregoing, it is clear that too parallel circuits having equal electrical impedances are provided through pipeline 26. The first of these parallel circuits may be traced from one terminal of winding 40, through conductor 48, through the right-hand portion of pipeline 26, and back through conductor 50 to the other terminal of winding 40. The other circuit may be traced from one secondary winding terminal, through conductor 48, through the left-hand portion of pipeline 26, and back through conductor 52 to the other terminal of winding 40.

The foregoing structure and circuitry is fully described in the aforesaid Patent No. 2,981,818, which is hereby incorporated by reference into this description.

Figure 4:
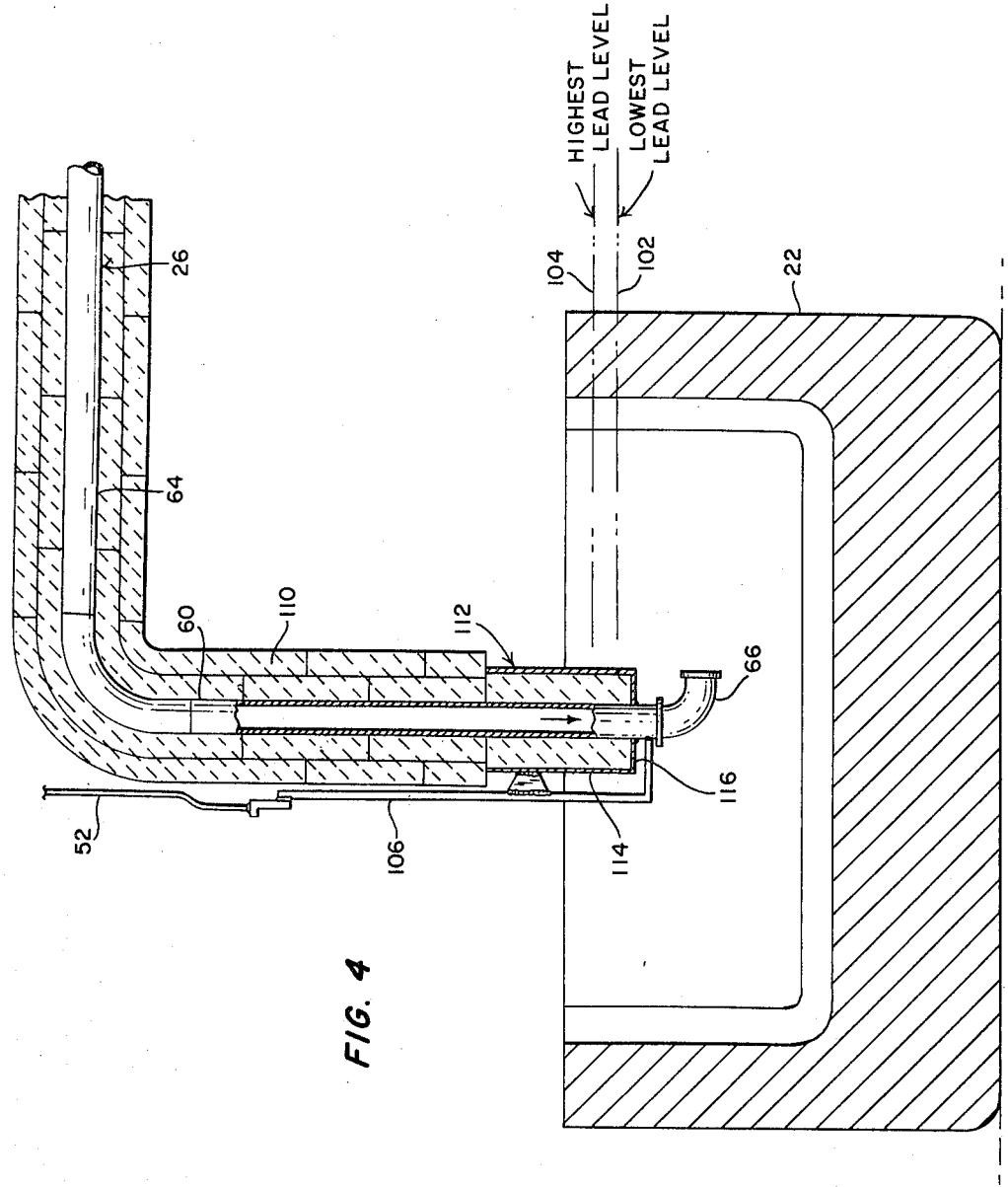
FIGURE 4 is an enlarged, partially sectioned, fragmentary elevation illustrating details of the pipeline heating system at the casting pot.

According to this invention, pipeline 26 is generally in the shape of an inverted U and comprises two vertical pipe portions 60 and 62 which are joined together by a generally horizontal pipe section 64. Pipe portion 60, as best shown in FIGURE 4, extends downwardly into casting pot 22 and preferably terminates at its lower end in an elbow 66 having a sidewardly extending outlet. Pipe portion 62, as shown in FIGURE 2, comprises a vertical section 68 extending downwardly from the horizontal section 64 and terminating at its lower end in an elbow 70 which is connected to a flange 72. Flange 72 is suitably connected to a mating flange 74 which, in turn, is connected to an elbow 76 to provide a horizontal section indicated generally at 78. Connected to the downwardly facing end of elbow 76 is a further vertical pipe section 80 which is essentially parallel to, but laterally offset from, pipe section 68.

As shown, pipe section 80 extends downwardly into melting pot 20 and terminates at its lower end near the bottom of pot 20 in an elbow 82. Elbow 82 is connected to one end of a horizontal pipe section 84, the other end of which is connected to the discharge port of pump 28.

An anchor assembly 86 supporting pipe portion 62 is shown in FIGURE 2 to comprise a pair of rigid, axially aligned, upper and lower pipes 88 and 90 which are secured together at adjacent ends by a flange assembly 92. The upper end of pipe 88 is welded to elbow 70 and the lower end of pipe 90 is welded to the metal frame of pot 20. Pipes 88 and 90 are vertical.

Flange assembly 92 comprises a pair of flanges 94 and 96 which are tightly secured together by suitable nut and bolt assemblies. Between flanges 94 and 96 is a layer of thermal and electrical insulation indicated at 98 in FIGURE 2. Owing to the comparatively small cross-sectional area of pipes 88 and 90, the heat loss from portion 62 of pipeline 26 is minimized. This avoids a cold spot that might chill or possibly solidify the molten metal. The heat loss is further minimized by insulation 98 which also electrically isolates flange 94 and pipe 90 from the transformer secondary load circuit.

With the foregoing pipeline construction, the assembly of pump 28 and motor 32 can quickly and easily be removed for repair or replacement simply by disconnecting flanges 72 and 74 and flanges 96 and 98 and by unbolting the pump and motor assembly from its support on pot 20.

The minimum level of molten metal in pot 20 is maintained considerably above the lower end of pipe section 80 and pump 28 as indicated at 100 in FIGURE 3. The level of molten metal will thus vary between the elevation at 100 and an elevation somewhat below the upper edge of the pot. Likewise, the minimum level of molten metal in casting pot 22 is maintained considerably above elbow 66 as indicated at 102 in FIGURE 4. The maximum level of molten metal in pot 22 is somewhat above the minimum level and, of course, is below the top of pot 22 as indicated at 104.

The horizontal pipe section 64 is pitched downwardly in one direction or the other or it is pitched downwardly from the impedance midpoint so that when pump 28 is shut down, the molten metal in section 64 will drain into either or both of the vertical pipe portions 60 and 62. Pipeline 26, from end to end, is airtight and has no vent holes. Accordingly, when molten metal is initially pumped through the pipeline, all the air is forced out. When the pump is stopped and the molten metal drains into either or both of the vertical portions 60 and 62, a vacuum will therefore be established in section 64 and the upper ends of pipe portions 60 and 62.

Atmospheric pressure acting on the minimum heads of molten metal in pots 20 and 22 thus maintains two columns of molten metal in pipe portions 60 and 62 to seal the ends of pipeline 26 against introduction of air when pump 28 is not operating. For stereo metal at about 600° F., it was found that these pressure supported columns in pipe portions 60 and 62 stand about 42 inches. Preferably, portions 60 and 62 of pipeline 26 are made somewhat longer than the standing columns of molten metal to assure that horizontal section 64 is drained when pump 28 is shut down. By sealing off the ends of pipeline 26 in this manner, entry of air and consequent formation of dross is avoided.

Furthermore, by maintaining elbow 66 below the minimum level 102 to provide the standing column and by connecting conductor 52 to the lower end of pipe portion 60 with a rigid metal terminal clip 106, dripping at the outlet end of elbow 66 is avoided. Thus no dross is formed and no freeze-up occurs at the discharge end of pipeline 26 to interfere with the unimpeded delivery of molten metal when pump 28 is re-started.

As best shown in FIGURE 3, conductor 50 is connected to the lower end of pipe section 80 just below the minimum molten metal level 100 by a rigid metal terminal clip 108. Both terminal clips 106 and 108 are advantageously fabricated from flat-sided bars which extend at their upper ends above the maximum levels of metal in pots 20 and 22 and which are connected by suitable clips to conductors 52 and 50 respectively. The lower ends of terminal clips 106 and 108 are welded to their respective pipe sections.

It is particularly important that terminal clips 106 and 108 be welded to the lowest parts of pipe portion 60 and pipe section 80. This assures current flow substantially throughout the entire length of pipeline 26 and particularly at its extremities. As a result, the desired temperature of the standing columns of molten metal in pipe portions 60 and 62 is maintained to avoid chilling or possible solidification.

It is also necessary, for the purpose of avoiding chilling and possible solidification of the molten metal in pipeline 26, to provide a thermal insulation covering 110 for the pipeline. Covering 110, as best shown in FIGURES 2 and 4, extends substantially the entire length of pipeline 26 between the connections of terminal clips 106 and 108 to their respective pipes. This is required to avoid cold spots.

The end of covering 110 on pipe portion 60 extends downwardly into and upwardly opening metal can 112. Can 112, as best shown in FIGURE 4, is formed with an annular side wall 114 and a flat-sided bottom wall 116 having a central aperture through which pipe portions 60 extends in coaxial relation to side wall 114. The annular space between side wall 114 and the periphery of pipe portion 60 is completely filled by the pipeline insulation. Bottom wall 116 is continuously welded around the edge of its central aperture to pipe portion 60 to preclude leakage of molten metal upwardly into the interior of can 112. The upper end of can 112 extends appreciably above the highest level of molten metal in pot 22. Can 112 thus prevents the hot molten metal from contacting and thereby damaging the insulation which is below the level of molten metal in the pot.

As best shown in FIGURE 3, the lower end of the pipeline insulation in melting pot 20 is also protected from the hot metal by a metal can 118 which is preferably of the same construction as can 112. Accordingly, like reference numerals have been applied to designate like portions of the cans.

Still referring to FIGURE 3, pipe section 80 extends through the centrally apertured bottom wall of can 118. The bottom wall of can 118 is welded around the edge of its central aperture to pipe section 80 in the same manner as described for can 112. The upper end of can 118 extends to the top of melting pot 20. Thus, can 118 provides a leak-proof enclosure for the lower portion of the insulation on pipe section 80 to prevent the molten metal from contacting and damaging the insulation.

As shown in FIGURE 3, terminal clip 108 extends downwardly along the side of can 118. Advantageously, a metal bracket 120, which is welded to the side wall of can 118 and to the vertical portion of terminal clip 108, braces and supports clip 108 against movement. Clip 106 may be supported in the same manner.

If conventional insulation sections were strapped on the pipeline in the usual end-to-end manner, the temperature-induced expansion of pipeline 26 would cause the opposed ends of the insulation sections to separate, thereby exposing part of the pipeline. The resulting heat loss would cause a cold spot tending to objectionably chill or even solidify the molten metal especially during periods when pump 28 is shut down. This condition is avoided according to the present invention by providing a double thickness insulation covering and a novel insulation expansion joint between the adjacent sections of the covering.

As shown in FIGURE 5, covering 110 comprises inner and outer annular layers 130 and 132, each made up of end-to-end, longitudinally split insulation sections which are generally indicated at 134. The insulation is secured to pipeline 126 by suitable bands and preferably is covered with canvas jackets. The thickness of sections 134 in both layers 130 and 132 is uniform and equal. The insulation expansion joint is generally indicated at 136. The adjacent insulation sections in layer 132 which have their opposed ends located at joint 136 are indicated at 134a and 134b. The adjacent insulation sections in layer 130 which have their opposed ends at joint 136 are indicated at 134c and 134d. The radial interfaces between adjacent insulation sections in layer 130 are axially offset or staggered with respect to the radial interfaces between the adjacent insulation sections in layer 132.

Still referring to FIGURE 5, an outer, annular insulation section 138 forming a part of joint 136 surrounds the opposed ends of sections 134a and 134b to overlap the interface between the opposed ends of sections 134a and 134b as well as the interface between sections 134c and 134d. Section 138 is secured by suitable bands to section 134b and cooperates therewith to define an annular recess 142 which slidably and interfittingly recives the adjacent end of section 134a. The internal periphery 144 of section 138 defines the cylindrical side wall of recess 142, and the annular end face 146 of section 134b defines the end wall of the recess.

To allow relative axial movement between sections 134a and 134b, sections 134b and 138 are covered by one canvas jacket 147, and section 134a is covered by a separate canvas jacket 148.

With continued reference to FIGURE 5, a rigid, flat-sided, annular ring coaxially receives a straight section of pipeline 26. Ring 150, as shown in FIGURE 6, is fixed to the pipeline by tack welding indicated at 152. The tack welds are spaced widely apart around the periphery of pipeline 26 and minimize the amount of heat transferred from the pipe to ring 150.

Ring 150 is disposed between insulation sections 134c and 134d and, when the pipe is cold, normally seats against, or at least is closely adjacent to, the opposed end faces of these sections. When expansion joint 136 is mounted on a vertical section of pipeline 26, ring 150 supports the insulation above it. The external diameter of ring 150 is made slightly smaller than the external diameters of sections 134c and 134d. This allows axial movement of ring 150 relative to section 134a.

As shown in FIGURE 5, ring 150 is overlapped by section 134a and thus is axially offset from the interface between sections 134a and 134b.

The parts of joint 136 and the insulation are shown in FIGURE 5 to be in their related positions when pipeline 26 is at room temperature. When the pipeline expands as a result of being heated, ring 150 moves upwardly with the expanding pipe portion, assuming that the lower end of the pipe in FIGURE 5 is anchored. Upward movement of ring 150 axially displaces sections 134d, 134b, and 138 upwardly and relative to sections 134a and 134c. This movement results in enlarged annular spaces between the ends of sections 134c and 134d and also between the opposed ends of sections 134a and 134b. But owing to the provision of section 138 and the axially staggered interfaces between axially adjacent insulation sections, a double thickness of insulation will be maintained radially along the entire length of the pipeline. For example, the thickness of insulation extending radially outwardly from the portion of the pipeline between the now axially separated sections 134c and 134d will be equal to the combined thicknesses of sections 134a and 138. Similarly, the thickness of insulation radially aligning with the space created between the opposed ends of sections 134a and 134b will be equal to the combined thicknesses of sections 134d and 138. Thus a minimum double thickness of insulation is preserved when the pipeline expands to minimize heat loss and thereby preclude the development of objectionable, localized cold spots.

Preferably, the lonigtudinal joints of section 138 and the insulation sections defining layers 130 and 132 are circumferentially staggered with respect to each other to further minimize heat loss. The insulation used may be of any suitable type such as a calcium silicate insulation.

To further minimize localized heat loss and the resulting occurence of cold spots, the electrical circuit connection to the impedance midpoint of pipeline 26 is formed by a pipe section 160 (see FIGURE 7) which is welded at one end to the pipeline 26. Pipe section 160 extends at right angles to section 64 of pipeline 26 and its welded end is cut to interfit with the pipeline periphery.

Figure 7:
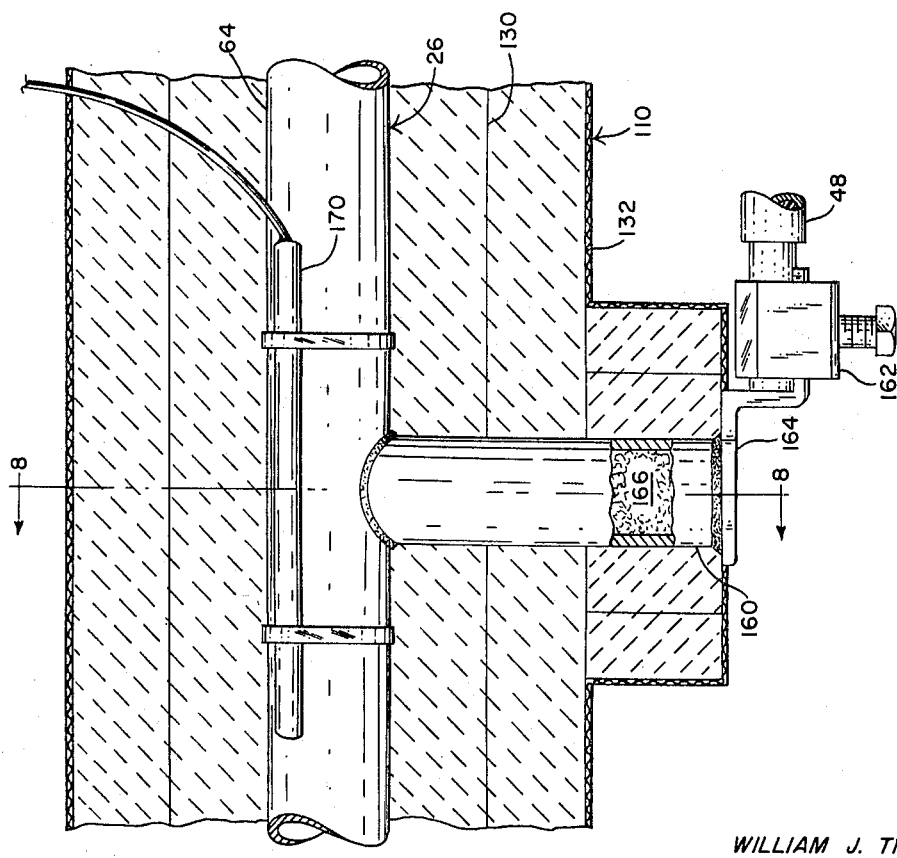
FIGURE 7 is an enlarged fragmentary section illustrating details of the transformer circuit connection to the impedance midpoint of the pipeline.

As shown in FIGURE 7, a terminal clip 162 is clamped to one end of conductor 48 and has a flat-sided section 164 which is welded to the flat outer end face of pipe section 160. The interior of pipe section 160 is packed with a suitable, high-temperature, thermal insulation indicated at 166. Section 164 of clip 162 covers the outer end of pipe section 160 to preclude the loss of insulation 166.

Owing to insulation 166 and the reduced cross-sectional area of pipe section 160, as compared with a solid bar, the transfer of pipeline heat through the electrical conductor connection of this invention to atmosphere is minimized. It is to be noted that although pipe section 160 has a comparatively reduced cross-sectional area, it does not present a greater resistance to current flow as compared with a solid bar because the major portion of current is carried along the periphery of the conductor, whether it be a pipe or a solid bar. This phenomenon is known as the skin effect of electrical conductors.

Figure 8:
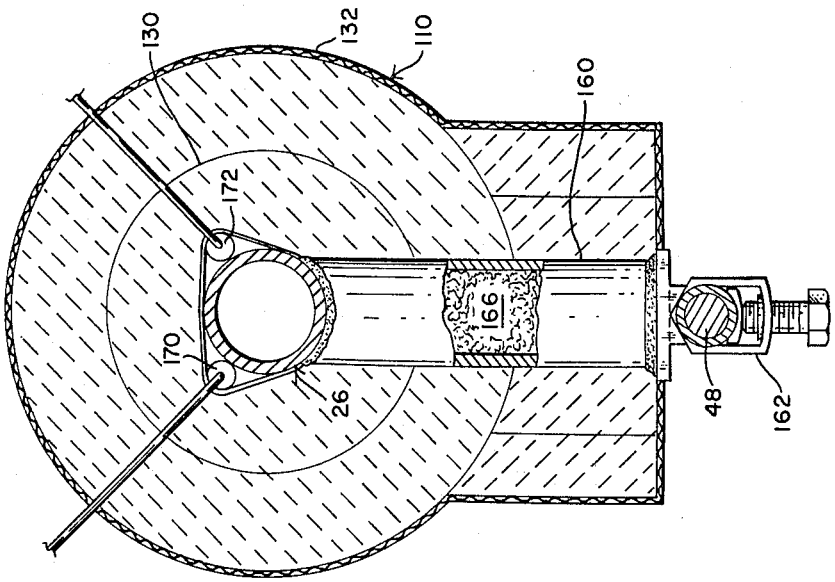
FIGURE 8 is a section taken along lines 8—8 of FIGURE 7.

As disclosed in the aforesaid Patent No. 2,981,818, the impedance pipeline heating system is controlled by two temperature sensing bulbs 170 and 172 (see FIGURES 7 and 8). One bulb, as described in the above-mentioned patent, is operatively connected to circuit 42 for automatically changing tap connections on the primary transformer winding 38. When the sensed temperature of pipeline 26 increases to correspondingly increase the electrical resistance in the transformer secondary load circuit, circuit 42 responds to decrease the number of primary turns connected across the voltage source. As a result, the voltage across the transformer secondary load circuit will be increased to effectively re-establish and restore initial power input to the pipeline. This operation is fully explained in the above-mentioned patent. The other bulb senses pipeline temperature to activate control circuit 42 for interrupting the transformer energizing circuit when a high limit pipeline temperature is reached. This operation also is explained fully in the above-mentioned patent.

According to this invention, bulbs 170 and 172, which are strapped to section 64 of pipeline 26, extend in parallel relation longitudinally along section 64 and are each disposed equidistantly on opposite sides of the electrical midpoint connection provided by pipe section 160. Therefore, pipeline temperatures at the portions of the pipe both to the left and to the right are sensed by each of the bulbs 170 and 172. In this connection, it will be recalled that the transformer secondary load circuitry is formed by two parallel circuits which respectively contain the pipeline portions to the left and right of the midpoint connection of conductor 48 to pipe section 64. Accordingly, each of the bulbs 170 and 172 senses the temperatures of the pipe portions in both of the secondary parallel circuits as well as sensing the temperature of the pipeline at the midpoint. If the impedances of the pipe portions in either of the secondary parallel circuits should become unbalanced for some reason to increase the temperature in part of the pipeline, this condition will be sensed and controlled. Also, any abnormal condition at the connection of pipe section 160 to pipeline 26 will also be sensed. As a result, a more sensitive, safe control of the pipeline heating current is obtained.

As previously mentioned, it is important that the pipeline insulation extend to the points where terminal clips 106 and 108 are connected to their respective pipe sections. Otherwise, the heat loss, especially during periods when pump 28 is shut down, would be so great that the molten metal standing in pipe portions 60 and 62 would chill or even solidify, even though there was continued heating of the pipeline.

The cans 112 and 118 make possible the applications of insulation 110 to pipeline portions which may be below the molten metal level in pots 20 and 22 during operation. Terminal clips 106 and 108 therefore can be connected to their respective pipe sections below the minimum operating levels of molten metal in pots 30 and 22 and insulation 110 can be extended down to these electrical connections. Thus, the pipeline portions between the maximum and minimum molten metal operating levels at both pots are heated by the transformer current and are protected from exposure by the insulation in cans 112 and 118.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A system for heating and transporting molten metal comprising a supply receptacle, a receiving receptacle, an electrically conductive pipeline having spaced apart substantially vertical first and second sections joined together by an intermediate section and respectively extending downwardly into said supply receptacle and said receiving receptacle, pump means disposed in said supply receptacle and being connected to said first vertical section for delivering molten metal through said pipeline to said receiving receptacle. the molten metal outlet of said second section and said pump means being disposed below the minimum operating levels of molten metal respectively in said receiving receptacle and supply receptacle, means for passing an electrical current through said pipeline to heat said pipeline and the molten metal therein and comprising at least two electrical terminal elements respectively connected to the lower ends of said first and second sections below the minimum molten metal operating levels in said receptacles to assure passage of current through the portions of the pipeline extending between the minimum molten metal operating levels and the maximum molten metal operating levels in both receptacles, thermal insulation means covering said pipeline and extending continuously along said pipeline to at least the minimum operating levels of molten metal in said supply receptacle and said receiving receptacle and means preventing contact of said molten metal with the insulation means extending along said pipeline portions, the immersion of said vertical sections below said minimum operating levels providing for atmospheric supported liquid columns in said first and second sections to seal both ends of said pipeline when opeation of said pump means is stopped, the lengths of said first and second sections being greater than the lengths of the liquid columns therein, and said intermediate section being pitched and shaped to drain residual molten metal at least into one of said vertical sections when operation of said pump means is stopped, said pipeline being airtight throughout its entire length to cooperate with said columns for preventing the admission of air into the pipeline interior and for maintaining a sub-atmospheric condition interiorly between said columns after molten metal is initially pumped through said pipeline and when operation of said pump means is stopped, the atmospheric pressure acting on the molten metal in said supply and receiving receptacles to raise the tops of said columns above the molten metal levels in said receptacles.

2. A system for heating and transporting molten metal comprising a supply receptacle, a receiving receptacle, an electrically conductive pipeline having spaced apart substantially vertical first and second sections joined together by an intermediate section and respectively extending downwardly into said supply receptacle and said receiving receptacle, pump means disposed in said supply receptacle and being connected to said first vertical section for delivering molten metal through said pipeline to said receiving receptacle, the molten metal outlet of said second section and said pump means being disposed below the minimum operating levels of molten metal respectively in said receiving receptacle and supply receptacle, means for passing an electrical current through said pipeline to heat said pipeline and the molten metal therein and comprising at least two electrical terminal elements respectively connected to the lower ends of said first and second sections below the minimum molten metal operating levels in said receptacles to assure passage of current through the portions of the pipeline extending between the minimum molten metal operating levels and the maximum molten metal operating levels in both receptacles, thermal insulation means covering said pipeline and extending continuously along said pipeline to at least the minimum operating levels of molten metal in said supply receptacle and said receiving receptacle, and means preventing contact of said molten metal with the insulation means extending along said pipeline portions, said means for passing the electrical current through said pipeline further comprising terminal means connected to said pipeline intermediate its opposite ends and means including conductor means cooperating with said terminal elements and said terminal means to form a circuit for transmitting electrical current through said pipeline, said terminal means comprising a tubular member welded at one end to said pipeline and extending radially from the periphery of said pipeline and means electrically connecting the opposite end of said tubular member to a conductor forming a part of said conductor means.

3. A system for heating and transporting molten metal comprising supply receptacle, a receiving receptacle, an electrically conductive pipeline having spaced apart substantially vertical first and second sections joined together by an intermediate section and respectively extending downwardly into said supply receptacle and said receiving receptacle, pump means disposed in said supply receptacle and being connected to said first vertical section for delivering molten metal through said pipeline to said receiving receptacle, the molten metal outlet of said second section and said pump means being disposed below the minimum operating levels of molten metal respectively in said receiving receptacle and supply receptacle, means for passing an electrical current through said pipeline to heat said pipeline and the molten metal therein and comprising at least two electrical terminal elements respectively connected to the lower ends of said first and second sections below the minimum molten metal operating levels in said receptacles to assure passage of current through the portions of the pipeline extending between the minimum molten metal operating levels and the maximum molten metal operating levels in both receptacles, thermal insulation means covering said pipeline and extending continuously along said pipeline to at least the minimum operating levels of molten metal in said supply receptacle and said receiving receptacle, and means preventing contact of said molten metal with the insulation means extending along said pipeline portions, said thermal insulation means including a first layer circumferentially surrounding said pipeline and a second layer circumferentially surrounding said first layer, each of the layers being defined by at least a pair of end-to-end, separately formed insulating sections of annular cross section, the interfere between opposed ends of insulation sections in said first layer being axially offset from the interface between opposed ends of insulation sections in said second layer, and an annular insulation section circumferentially surrounding the adjacent ends of insulation sections in said second layer in overlapping relation to the interface therebetween and being fixed to one of the insulation sections in said second layer to cooperate therewith for defining an annular axially opening recess coaxially and slidably receiving the opposed end of the other of said insulation sections in said second layer, expansion of said pipeline upon heating tending to axially displace the insulation sections in each layer relative to each other to form a space between opposed ends of the insulation sections in each layer, said annular insulation section being sufficiently long that it continuously overlaps the interfaces between insulation in both of said layers to maintain an additional thickness of insulation radially aligning with the spaces formed between adjacent insulation sections in each layer as a result of pipeline expansion.

4. The system defined in claim 3 wherein said insulation layers are disposed along a vertical portion of said pipeline and wherein said system further comprises rigid ring means coaxially fixed to said pipeline and being disposed between opposed ends of the insulation sections in said first layer, said ring means having an external diameter slightly smaller than the external diameter of the insulation sections in said first layer and providing a base for supporting the insulation above it.

5. A system for heating and transporting molten metal comprising supply receptacle, a receiving receptacle, means comprising an electrically conductive pipeline having an inlet at said supply receptacle and an outlet at said receiving receptacle for transferring molten metal from said supply receptacle to said receiving receptacle, and means for passing an electrical current through said pipeline to heat said pipeline and the molten metal therein comprising first and second terminal elements connected to said pipeline respectively near the inlet and outlet ends thereof, terminal means connected to said pipeline between said first and second terminal elements and conductor means cooperating with said first and second terminal elements and said terminal means to form a circuit for transmitting current through said pipeline, said terminal means comprising a tubular member welded at one end to said pipeline and extending radially from the pipeline periphery, thermal insulation means received in said tubular member and filling at least a portion thereof, and means connecting the opposite end of said tubular member to said conductor means and blocking said opposite end to prevent the loss of the insulation means therein.

6. A system for heating and transporting molten metal comprising supply receptacle, a receiving receptacle, means comprising an electrically conductive pipeline having an inlet at said supply receptacle and an outlet at said receiving receptacle for transferring molten metal from said supply receptacle to said receiving receptacle, and means for passing electrical current through said pipeline to heat said pipeline and the molten metal therein comprising first and second terminal elements connected to said pipeline at axially spaced apart regions, a third terminal element connected to an intermediate region of said pipeline between said first and second elements, means cooperating with said first, second, and third terminal elements for forming two parallel circuits respectively containing a first portion of said pipeline between said first and third elements and a second portion of said pipeline between said second and third elements, and means including an element extending axially past said intermediate region and along both said first and second pipeline portions for simultaneously sensing the temperature of said pipeline at said first and second portions and said intermediate region to control the electrical current heating said pipeline.

7. The system defined in claim 6 wherein said terminal means is connected to the impedance midpoint of said pipeline.

References Cited

UNITED STATES PATENTS

| | | | |
|---|---|---|---|
| 2,568,578 | 9/1951 | Bennett | 13—33 |
| 2,660,769 | 12/1953 | Bennett | 219—301 XR |
| 2,707,313 | 5/1955 | McShurley et al. | 219—301 XR |
| 2,981,818 | 4/1961 | Trabilcy | 219—300 |

ANTHONY BARTIS, *Primary Examiner.*